US010796243B2

(12) United States Patent
Bellala et al.

(10) Patent No.: US 10,796,243 B2
(45) Date of Patent: Oct. 6, 2020

(54) NETWORK FLOW CLASSIFICATION

(71) Applicant: Hewlett Packard Enterprise Development LP, Houston, TX (US)

(72) Inventors: Gowtham Bellala, Palo Alto, CA (US); Jung Gun Lee, Mountain View, CA (US); Wei Lu, Austin, TX (US)

(73) Assignee: Hewlett Packard Enterprise Development LP, Houston, TX (US)

(*) Notice: Subject to any disclaimer, the term of this patent is extended or adjusted under 35 U.S.C. 154(b) by 744 days.

(21) Appl. No.: 15/307,619

(22) PCT Filed: Apr. 28, 2014

(86) PCT No.: PCT/US2014/035621
§ 371 (c)(1),
(2) Date: Oct. 28, 2016

(87) PCT Pub. No.: WO2015/167421
PCT Pub. Date: Nov. 5, 2015

(65) Prior Publication Data
US 2017/0053214 A1  Feb. 23, 2017

(51) Int. Cl.
G06N 20/00 (2019.01)
H04L 29/06 (2006.01)
G06K 9/62 (2006.01)
G06N 5/04 (2006.01)

(52) U.S. Cl.
CPC .......... *G06N 20/00* (2019.01); *G06K 9/6223* (2013.01); *G06K 9/6272* (2013.01); *G06N 5/04* (2013.01); *H04L 63/0227* (2013.01); *H04L 63/1416* (2013.01)

(58) Field of Classification Search
CPC ........ G06N 20/00; G06N 5/04; G06K 9/6223; G06K 9/6272; H04L 63/0227; H04L 63/1416
See application file for complete search history.

(56) References Cited

U.S. PATENT DOCUMENTS

| 7,574,409 | B2 | 8/2009 | Patinkin |
| 8,311,956 | B2 | 11/2012 | Sen et al. |
| 8,542,592 | B2 | 9/2013 | Moisand |
| 8,676,729 | B1* | 3/2014 | Keralapura ......... H04L 63/1416 706/12 |
| 8,694,630 | B1* | 4/2014 | Keralapura ......... H04L 47/2441 709/223 |
| 2006/0239219 | A1 | 10/2006 | Haffner et al. |
| 2007/0043565 | A1 | 2/2007 | Aggarwal et al. |
| 2011/0040706 | A1 | 2/2011 | Sen et al. |

(Continued)

FOREIGN PATENT DOCUMENTS

WO  WO-2010116036  10/2010

OTHER PUBLICATIONS

Sena et al. "Early traffic classification using Support Vector Machines" Sep. 25, 2009. pp. 1-7. (Year: 2009).*

(Continued)

Primary Examiner — Li B. Zhen
Assistant Examiner — Henry Nguyen

(57) ABSTRACT

Network flow classification can include clustering a network flow database into a number of at least one of applications and network flows. Network flow classification can include classifying the number of the at least one of applications and network flows.

13 Claims, 5 Drawing Sheets

(56) References Cited

U.S. PATENT DOCUMENTS

2011/0093785 A1  4/2011  Lee et al.
2012/0275377 A1  11/2012  Lehane et al.
2012/0284791 A1  11/2012  Miller et al.
2013/0039183 A1  2/2013  Nooren et al.

OTHER PUBLICATIONS

Bujlow, Tomasz, et al., "Classification of HTTP traffic based on C5.0 Machine Learning Algorithm", Jul. 1-4, 2012.
Bujlow, Tornasz, et al., "Volunteer-Based System for classification of traffic in computer networks", 2011.
Zander, Sebastian, et al., "Automated Traffic Classification and Application Identification using Machine Learning", Centre for Advanced Internet Architecture: Swinbure University of Technology, Melbourne, AU; pp. 250-257, Nov. 17, 2005.
Chandola et al., "Anomaly Detection: A Survey", in ACM Computing Surveys, 2009, vol. 41, No. 3, 58 pages.
Kim et al., "Internet Traffic Classification Demystified: Myths, Caveats, and the Best Practices", in ACM SIGCOMM CoNEXT, 2008, 12 pages.
Nguyen et al., "A survey of techniques for Internet traffic classification using machine learning", in IEEE Communications Surveys and Tutorials, vol. 10, No. 4, 2008, pp. 56-76.
Piraisoody et.al., "Classification of Applications in HTTP Tunnels", IEEE 2nd International Conference on Cloud Networking (CloudNet), 2013, pp. 67-74.

* cited by examiner

NETWORK FLOW CLASSIFICATION

BACKGROUND

Machine learning (ML) includes the construction and study of systems that can learn from data. An objective of a learning machine is to generalize from its experience. For instance, generalization can include the ability of a learning machine to perform accurately on new, unseen examples/tasks after having experienced a learning data set. The training examples may come from some generally unknown probability distribution (e.g., representative of the space of occurrences), and the learner has to build a general model about this space that enables it to produce sufficiently accurate predictions in new cases.

DETAILED DESCRIPTION

The "bring your own device" trend imposes challenges for enterprise information technology (IT). An example challenge may include securing enterprise IT infrastructure while allowing increasing numbers of mobile devices to use the infrastructure. Mobile devices can include high bandwidth consumption and a variety of applications. The growth of the mobile internet and the advent of cloud services can introduce myriads of new applications into these infrastructures. As a result, business IT, service providers, and others look for mobile application visibility that can enable more intelligent network access control, improve compliance, enhance security, deliver better user experience (e.g., quality of service (QoS)), and enable dynamic policy enforcement, among others.

Some approaches may include using network transport port numbers, deep packet inspection (DPI)-based application fingerprinting, and application protocol decoders. However, these approaches may not be adequate or scalable for mobile applications. Other approaches may include supervised ML-based network traffic characterization, but this may classify a new or unseen network flows (or new/unseen applications that generate the new/unseen network flows) into one of know application classes, hurting accuracy when a new (e.g., potentially malicious) mobile application is being deployed.

In contrast, network flow classification according to the present disclosure can include detecting new network flow (e.g., applications) in real-time. As used herein, a network flow can include a sequential collection of network packets that have identical packet header values. In a number of examples, the 5-tuple of source internet protocol (IP) address, destination IP address, source port number, destination port number, and the protocol field (e.g., transmission control protocol (TCP) or user datagram protocol (UDP)) can define a unique flow. For instance, the new network flow can be detected just as it is introduced into a network. Network flow classification in accordance with the present disclosure can include an ML-based approach of clustering network flows to learn their signatures (e.g., application signatures associated with the network flow), and using a new flow detection approach to determine whether the network data flows are new or existing, based on those signatures and/or a distance between a particular network data flow and a particular cluster. As a result, network flow classification in accordance with the present disclosure can deliver increased accuracy and can provide a fine-granularity of application identification without requiring large amounts of computing resources and time. Network flow classification in accordance with the present disclosure can also provide information useful in determining when to re-train existing application detection system(s) to incorporate signatures of the new applications.

Figure 1:
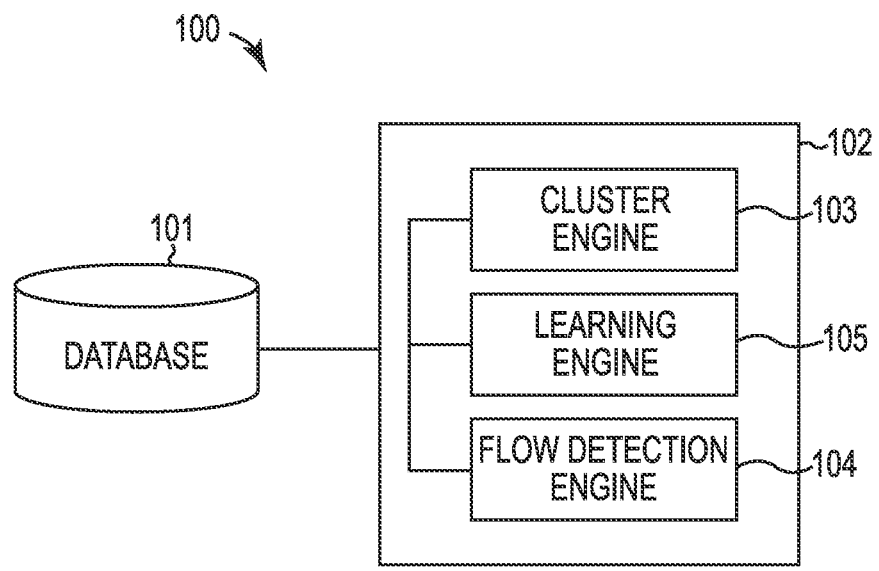
FIG. 1 is a diagram illustrating an example of a system according to the present disclosure.

FIG. 1 is a diagram illustrating an example of a system 100 according to the present disclosure. The system 100 can include a database 101, a subsystem 102, and/or a number of engines (e.g., cluster engine 103, learning engine 105, and/or flow detection engine 104). As used herein, "a" or "a number of" something can refer to one or more such things. For example, "a number of widgets" can refer to one or more widgets. The subsystem can include the number of engines in communication with the database 101 via a communication link. The system 100 can include additional or fewer engines than illustrated to perform the various functions described herein.

The number of engines can include a combination of hardware and programming configured to perform a number of functions described herein (e.g., classifying network flow). The programming can include program instructions (e.g., software, firmware, etc.) stored in a memory resource (e.g., computer readable medium (CRM), machine readable medium (MRM), etc.) as well as hard-wired program (e.g., logic).

The cluster engine 103 can include hardware and/or a combination of hardware and programming to cluster (e.g., partition) a number of applications within a network into a number of clusters. In some examples, the cluster engine can cluster the number of applications using an unsupervised clustering approach on an existing network flow database. An unsupervised clustering approach, as used herein, can include a clustering approach in which only data flow information is known; information about an application or applications corresponding to the data flow is not known. In such an example, which applications(s) correspond to which data flow is not known, so a supervised model (e.g., algorithm) would not allow for ML. Supervised learning can include using a supervised model (e.g., algorithm) to learn information (e.g., an application signature), for example, while having access to data flow information and information regarding the application corresponding to the data flow.

In a number of examples, the cluster engine can learn the number of clusters (or signatures) and the size (e.g., radius) of each cluster automatically from the received data (e.g., from a network flow database). As such, in some examples, the cluster engine can auto-learn the number of clusters, the size of each of the number of clusters, and the shape of each of the number of clusters (e.g., without user input).

In some instances, the cluster engine can periodically update the clustered number of applications (e.g., as more data is collected). In some instances, these updates can be done in real-time. The cluster engine can, in some examples, cluster engine to cluster the number of applications using an unsupervised clustering approach on a real-time network flow capture system and/or an existing network flow database. As used herein, a real-time network flow capture system can include a network appliance is capable of capturing network traffic such as a home router used to connect to the Internet. Other examples include a switch, a firewall, a wireless access point, an intrusion detection system, a network sniffer, etc.

As will be discussed further herein with respect to FIG. 3 and as noted above, in the present disclosure, an unsupervised clustering approach (e.g., using an unsupervised model), can be used on an existing network flow database to identify different flow patterns within the database. In some examples, an iterative clustering technique can be utilized to identify these flow patterns.

The learning engine 105 can include hardware and/or a combination of hardware and programming to learn a signature for each of the number of applications based on the number of clusters. As used herein, an application signature (e.g., application feature signature) can include features associated with the application. Data flow features (e.g., destination IP, port numbers, sizes of a few first packets) can be unique to each application. For instance, a group of Twitter flows may all have the same IP address, same port number, and same sizes for the first few packets, and this can be referred to as the application signature. However, there may be a number of such unique signatures corresponding to each application. As such, in accordance with the present disclosure, ML techniques can be used to auto-learn signatures corresponding to different applications.

For instance, learning engine 105 can learn the signature by learning training data—a combination of feature data and ground truth data. Feature data (e.g., destination IP, port number, sizes of the first few packets for a number of network flows. Ground truth data can correspond to an application name for each of the number of network flows. As will be discussed further herein, flow detection engine 104 can use both feature data and ground truth data to learn a correspondence between feature data and an application name. Cluster engine 103 may use only the feature data (e.g., and not the ground truth data) to extract different clusters in the data, where each cluster corresponds to a unique signature. Cluster engine 103, in some examples, may not label the application corresponding to each cluster, as it does not use the ground truth data.

The flow detection engine 104 can include hardware and/or a combination of hardware and programming to classify each of the number of applications based on the learned signatures. For instance, in a number of examples, flow detection engine 104 can include hardware and/or a combination of hardware and programming to classify each of the number of applications as a new application or an existing application based on the learned signatures.

In particular, flow detection engine 104 can classify a first one of the number of applications as a new application in response to a determined distance between the first one of the applications and a particular cluster being greater than a threshold distance. Similarly, flow detection engine 104 can classify a first one of the number of applications as an existing application in response to a determined distance between the first one of the number of applications and a particular cluster being less than a threshold distance.

The determined distance, as will be discussed further herein, can include a distance between a cluster and a particular application. For instance, if the particular application falls within that distance, it may be considered part of the cluster, and thus not a new (but rather an existing) application because the application signatures fall within a similarity threshold. Should the particular application fall outside the distance, it may be considered a new application. These distances can, in part, be determined based on an application's signature.

In some examples, the number of engines can cluster, learn, and classify with respect to the data flows, themselves. For instance, rather than classifying applications, the flow detection engine can classify data flows into new or existing data flows, as will be discussed further herein.

Figure 2:
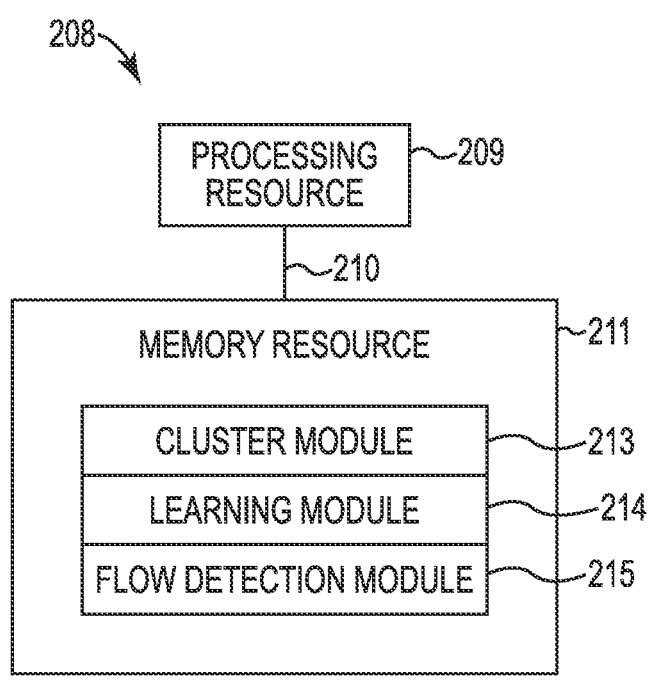
FIG. 2 is a diagram illustrating an example of a device according to the present disclosure.

FIG. 2 is a diagram illustrating an example of a device 208 according to the present disclosure. The device 208 can utilize software, hardware, firmware, and/or logic to perform a number of functions.

The device 208 can be a combination of hardware and program instructions configured to perform a number of functions (e.g., actions). The hardware, for example, can include a number of processing resources 209 and a number of memory resources 211 (e.g., CRM, MRM, database, etc.). The memory resources 211 can be internal and/or external to the device 208 (e.g., the device 208 can include internal memory resources and have access to external memory resources). The program instructions (e.g., machine-readable instructions (MRI)) can include instructions stored on the MRM to implement a particular function. The MRI can be executable by one or more of the processing resources 209. The memory resources 211 can be coupled to the device 208 in a wired and/or wireless manner. For example, the memory resources 211 can be an internal memory, a portable memory, a portable disk, and/or a memory associated with another resource, e.g., enabling MRI to be transferred and/or executed across a network such as the Internet.

Memory resources 211 can be non-transitory and can include volatile and/or non-volatile memory. Volatile memory can include memory that depends upon power to store information, such as various types of dynamic random access memory (DRAM) among others. Non-volatile memory can include memory that does not depend upon power to store information. Examples of non-volatile memory can include solid state media such as flash memory, electrically erasable programmable read-only memory (EEPROM), phase change random access memory (PCRAM), magnetic memory such as a hard disk, tape drives, floppy disk, and/or tape memory, optical discs, digital versatile discs (DVD), Blu-ray discs (BD), compact discs (CD), and/or a solid state drive (SSD), etc., as well as other types of machine-readable media.

The processing resources 209 can be coupled to the memory resources 211 via a communication path 210. The communication path 210 can be local or remote to the device 208. Examples of a local communication path 210 can include an electronic bus internal to a machine, where the memory resources 211 are in communication with the processing resources 209 via the electronic bus. Examples of such electronic buses can include Industry Standard Architecture (ISA), Peripheral Component Interconnect (PCI), Advanced Technology Attachment (ATA), Small Computer System Interface (SCSI), Universal Serial Bus (USB), among other types of electronic buses and variants thereof. The communication path 210 can be such that the memory resources 211 are remote from the processing resources 209, such as in a network connection between the memory resources 211 and the processing resources 209. That is, the communication path 210 can be a network connection. Examples of such a network connection can include LAN, wide area network (WAN), PAN, and the Internet, among others.

As shown in FIG. 2, the MRI stored in the memory resources 211 can be segmented into a number of modules (e.g., cluster module 213, learning module 214, and/or flow detection module 215) that when executed by the processing resources 209 can perform a number of functions. As used herein, a module includes a set of instructions included to perform a particular task or action. For instance, cluster module 213 can include instructions to cluster a network flow database into a number of clusters of data flows and detect a data flow that is not within any one of the number of clusters of data flows. Learning module 214 can include instructions to calculate a distance between the data flow and each of the number of clusters. Flow detection module 215 can include instructions to classify the data flow based on each of the calculated distances.

The number of modules can be sub-modules of other modules. For example, the cluster module 213 can be a sub-module of the learning module 214 and/or the flow detection module 215. In some examples, cluster module 213, learning module 214, and/or flow detection module 215 can be contained within a single module. Furthermore, the number of modules can comprise individual modules separate and distinct from one another. Examples are not limited to the specific modules illustrated in FIG. 2.

Each of the number of modules can include executable instructions that can function as a corresponding engine as described with respect to FIG. 1. For example, cluster module can function as cluster engine 103, learning module 214 can function as learning engine 105, and flow detection module 215 can function as flow detection engine 104.

Figure 3:
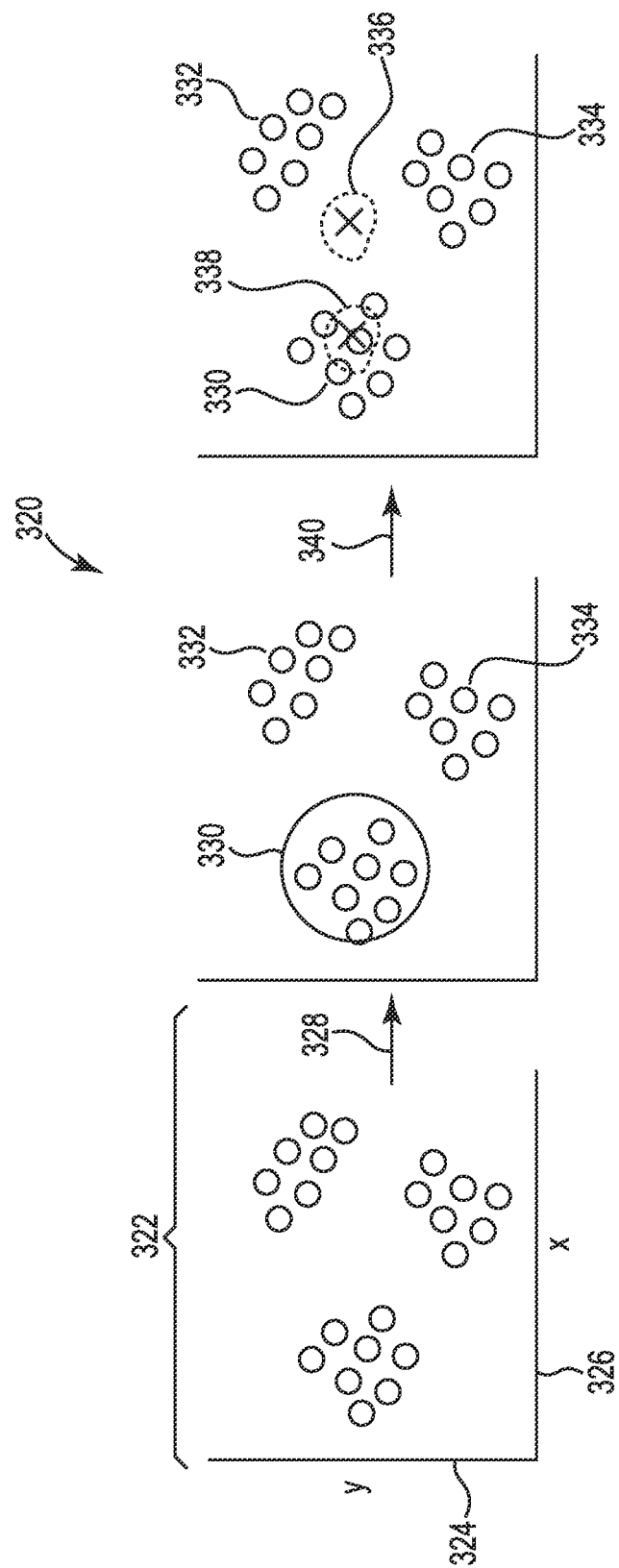
FIG. 3 is a diagram illustrating an example of network flow classification according to the present disclosure.

FIG. 3 is a diagram 320 illustrating an example of network flow classification according to the present disclosure. Network flow classification can include the use of an unsupervised clustering model (e.g., algorithm) such as k-means clustering, hierarchical clustering, and mixture models, among others. The unsupervised model can be used on an existing network flow database to identify different flow patterns, applications, and application signatures, among others. Network flow classification according to the present disclosure can include an iterative clustering approach that can overcome shortcomings associated with some clustering techniques including the requirement of prior knowledge regarding a number of clusters to be identified (e.g., as in k-means, mixture models, and spectral clustering, among others).

This iterative clustering approach can include inputs of network flow database 322, and a cluster size (e.g., radius, distance) r. The cluster size r can include the radius, diameter, or any other measurement of the tightness of a cluster, and in some examples, can be user-defined. An example cluster distance may include 10 bytes, for instance. The size r can be specific to a particular domain and particular data flow packet sizes in some examples. As shown in diagram 320, network flow database 322 (e.g., an entire data set) can be represented on an x-y coordinate system, with the x-axis representing a first packet size, and the y-axis including a second packet size. However, examples of the present disclosure are not limited to two packet sizes.

At 328, data flow within network flow database 322 can undergo a clustering process (e.g., an iterative clustering process). As a part of the clustering, network flow database 322 can be clustered into an arbitrarily chosen number of clusters k. A clustering model (e.g., algorithm) such as the k-means algorithm can be used for the clustering, though examples of the present disclosure are not limited to the k-means algorithm for clustering. If k is less than the number of clusters in the data set within network flow database 322, clusters have the potential to be merged. For instance, clusters in the data set with similar characteristics may be merged to reach the chosen number of clusters k.

Such clusters may either be separated as a part of cluster cleansing, or in subsequent iterations. If k is greater than the number of clusters in the dataset, the clustering approach may return empty clusters. This clustering can use a clustering technique (e.g., such as k-means clustering) that supports creation of empty clusters when k is overestimated.

As part of the clustering approach, each cluster may be cleaned by removing data flows outside the defined size r from a cluster centroid. For instance, a cluster with a centroid (e.g., a central vector which may not necessarily be a member of the data set/cluster) falling outside size (e.g., radius, distance) r may be removed and/or ignored. As a result, clusters that agree with (e.g., fall within) the size r can be chosen from the resulting cleaned clusters based on the cluster size. These can be referred to as "top" clusters. For instance, in FIG. 3, cluster 330 may be chosen as a top cluster, while clusters 332 and 334 are ignored. In an example, flows corresponding to the top cluster 330 from network flow database 322 can be removed (e.g., all corresponding flows can be removed) to create a residual database. This database can include, for instance, ignored clusters 332 and 334.

Periodically (e.g., once every few iterations) clusters chosen as top clusters can be merged to make sure that the resulting clusters are distinct and well-separated. Overlapping clusters can be merged, and flows that are outside the size r of the new cluster can be transferred to the residual database.

The clustering approach can be repeated (e.g., an iterative clustering approach) in some examples until a termination criterion is met. For instance, the approach may be termination when all of the data flows of database 322 are clustered and/or no other cluster is identified (e.g., data flows are present, but no suitable clusters available within those data flows, no viable clusters remain, all viable clusters are formed, etc.).

In a number of examples, an un-clustered flow assignment can be applied to check if any of the remaining data flows can be assigned to existing clusters by assigning flows to clusters that are within size r to the data flow. For instance, during the previous portions of the clustering approach, some network flows may not be assigned to any cluster (e.g., because they do not fall within the defined cluster size). Accordingly, if any such network flows are within a threshold (e.g., close to) to an existing cluster, that existing cluster may be expanded (e.g., periodically) to fit the network flow(s). In addition, if there are a threshold number (e.g., a particular, significant number) of remaining flows close to one of the existing clusters (e.g., within a size of r2 from the closest cluster centroid (r2>r)), such data flows can be merged to the closest cluster, the cluster centroid and cluster radius can be updated. For example, the size can be expanded to accommodate nearby data flows. In some examples, flows that fall outside the new size (e.g., r2 can be considered the new size r) can be removed.

The clustering approach in accordance with the present disclosure can result in tight clusters such that the data flows belonging to a given cluster (e.g., all the data flows) are within a distance r to the cluster centroid. For example, if the network flow database consists of the top few packet sizes as features, and the cluster radius r is defined to be 10 bytes, then the approach can result in the flows belonging to each cluster being within 10 bytes from the cluster centroid. Moreover, since the approach does not require prior knowledge on the number of clusters, it may be less susceptible to over or under fitting of data as compared to other ML approaches.

In a number of examples, a cluster centroid for each cluster can be computed, and that centroid can denote the flow signature for that cluster. These signatures can be compiled in a database. In some examples, this flow signature database can be used to detect new (e.g., unseen) flows in real-time. The clustering approach can reduce new network flow detection overhead costs by reducing the number of flow signatures against which a new network flow is compared. This may be useful for implementation of new network flow detection on limited resource network devices or security devices.

At 340, a new flow detection approach can be used to detect new (e.g., potentially malicious) network flows (e.g., in real time, as they are received by the database). This can include, for example, computing the distance of a new network flow to each cluster centroid to identify a nearest cluster. For instance, in FIG. 3, a distance between new network flow 336 and centroid 338 of cluster 330 can be computed. Though not illustrated in FIG. 3, distances between new network flow 336 and centroids of clusters 332 and 334 can also be calculated. A threshold distance to the nearest cluster can be used to classify the network flows as either a new network flow (e.g., a new application, category, etc.) or an existing network flow (e.g., existing application, category, etc.). Specifically, if this distance is greater than the cluster distance r, the flow can be classified as a new flow.

Figure 4:
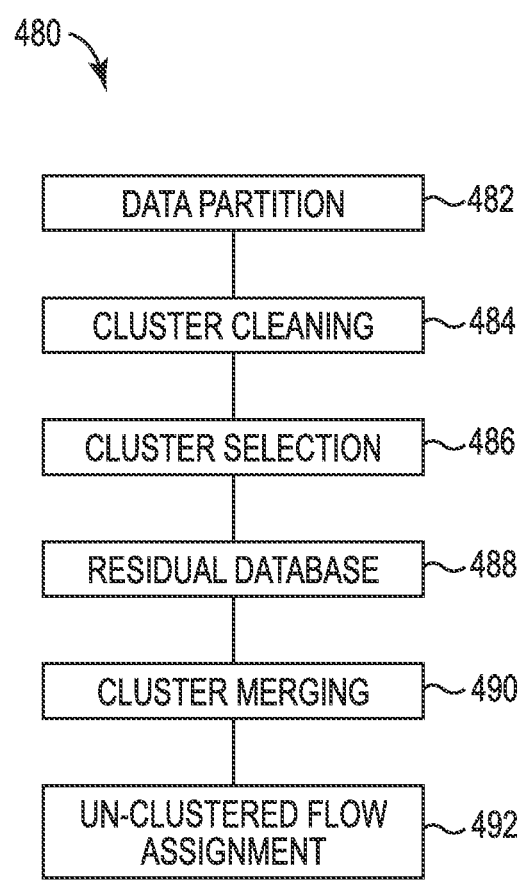
FIG. 4 is a flow chart illustrating a method according to the present disclosure.

FIG. 4 is a flow chart illustrating a method 480 according to the present disclosure. Method 480 includes an iterative clustering approach, as discussed with respect to FIG. 3. At 482, a network flow database is clustered or "partitioned" into an arbitrarily chosen number of clusters k. This clustering can be performed, for instance, using a clustering technique, such as k-means, that supports creation of empty clusters when k is overestimated.

At 484, each cluster is cleaned by removing flows outside of a defined cluster size r (e.g., as measured from a cluster centroid). At 486, top clusters are chosen from the resulting clean clusters based on the cluster size. For instance, top clusters are chosen based on whether or not they fit within defined cluster size r.

At 488, a residual database can be formed by removing all of the network flows that are not deemed top clusters (e.g., do not fit within defined cluster size r. At 490, clusters may be merged. For instance, periodically (e.g., once every few iterations), merging can be performed to keep resulting clusters distinct and well-separated. Overlapping clusters can be merged, and network flows outside the new cluster size can be transferred to the residual database.

Method portions 482, 484, 486, 488, and 490 can be iterated, in some examples, until particular termination criteria are met. For instance, iterations may cease when all of the network flows are clustered, or when no viable clusters remain.

At 492, an unclustered flow assignment can be utilized to check if any remaining flows can be assigned to existing clusters. For instance, during the previous portions (e.g., portions 482, 484, 486, 488, and 490) of the iterative clustering approach, some network flows may not have been assigned to any cluster (e.g., because they do not fall within the defined cluster size r). Accordingly, if any such network flows are within a threshold (e.g., close to) to an existing cluster, that existing cluster may be expanded to fit the network flow(s). In response the completion of the iterative clustering method 480, a new flow detection approach can be performed, as discussed previously with respect to FIG. 3, and as will be discussed further herein.

Figure 5:
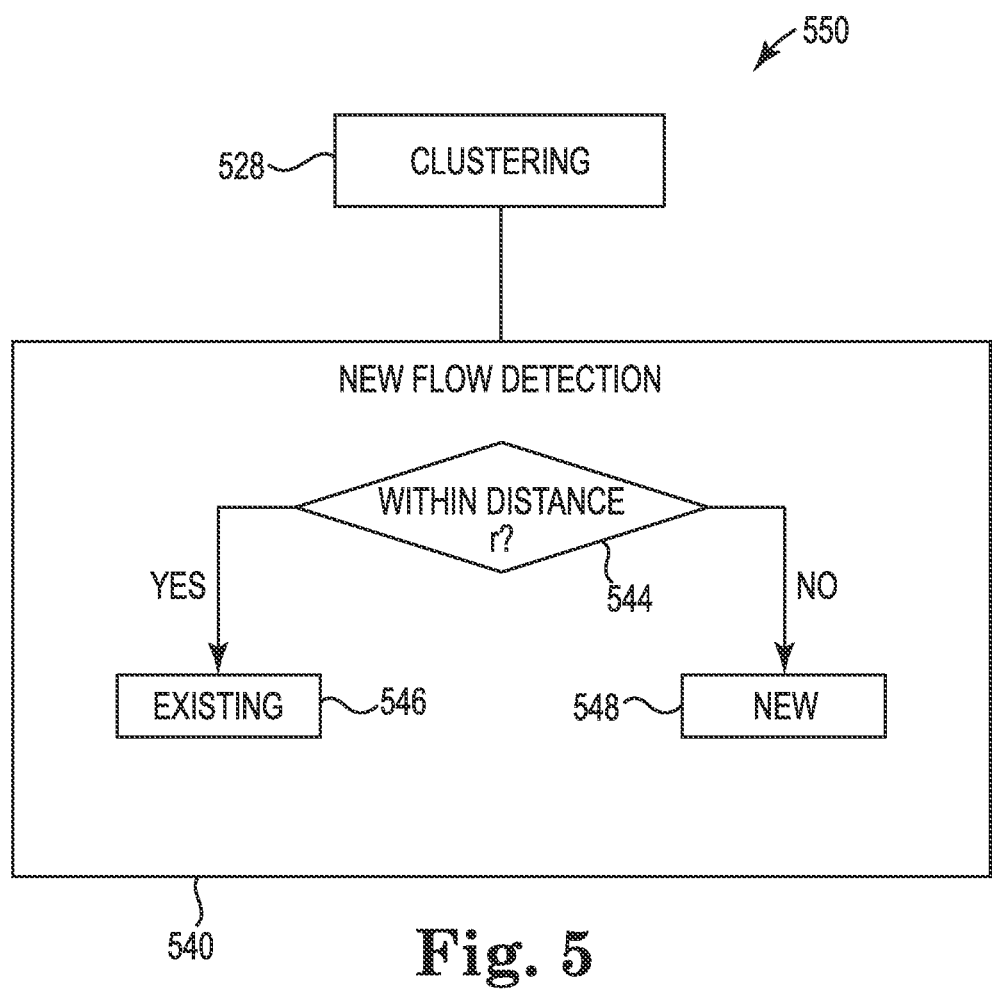
FIG. 5 is a flow chart illustrating a method according to the present disclosure.

FIG. 5 is a flow chart illustrating a method 550 according to the present disclosure. At 528, method 550 includes implementing a clustering approach. The clustering approach, as discussed previously with respect to FIG. 3, can include, for instance, clustering a network flow database into clusters, cleaning the clusters, selecting top clusters, and creating a residual database including those clusters not selected as top clusters. The clustering approach, as discussed with respect to FIG. 3, can also include periodically merging clusters (e.g., overlapping clusters) to increase distinction and separation. When these newly merged clusters are formed, network flows (e.g., applications) falling outside of the merged clusters can be transferred to the residual database.

In some examples, the clustering approach can be iterative, such that some or all of the portions of the approach can be repeated until particular termination criteria are met (e.g., all network flows are clustered, no remaining viable clusters identified, etc.). Additionally, the clustering approach can include expanding a cluster size r to accommodate nearby/neighboring network flows.

At 540, method 550 includes the implementation of a new flow detection approach. As discussed with respect to FIG. 3, new flow detection can include computing a distance between a new flow and a cluster centroid to identify a nearest cluster. Once the nearest cluster is determined, a calculation of the distance is performed to determine whether the distance falls within cluster size r. If the distance does fall within size r, the network flow (e.g., application) is determined to be an existing network flow, as at 546. However, if the distance does not fall within size r, the network flow is determined to a new network flow, as at 548. While it may not be know what the new network flow is, a value can be applied to this new network flow, and when same or similar new network flows enter the network flow database (e.g., database 322), the same or similar values can be given to those network flows (e.g., the flows can be "learned").

Figure 6:
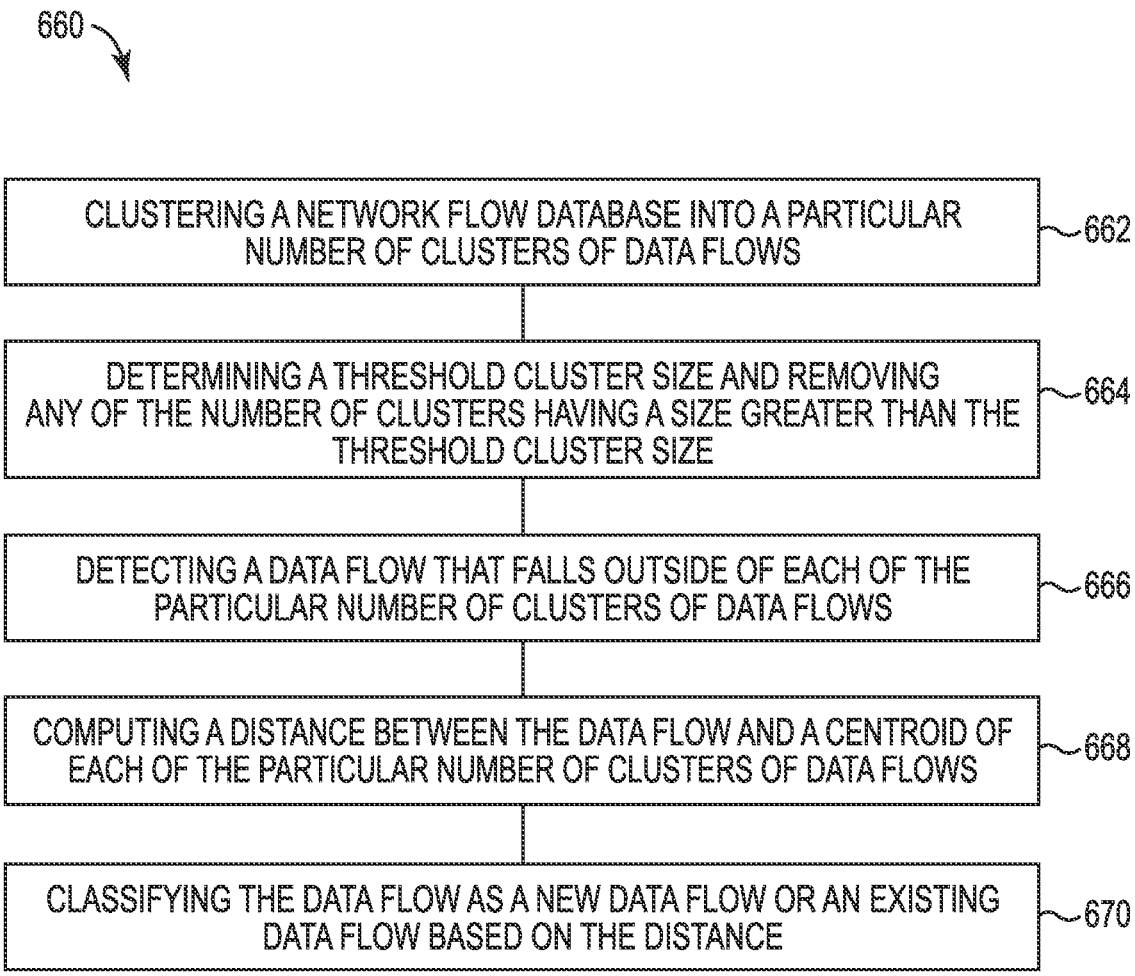
FIG. 6 is a flow chart illustrating a method according to the present disclosure.

FIG. 6 is a flow chart illustrating a method 660 according to the present disclosure. At 662, method 660 includes clustering a network flow database into a particular number of clusters of network flows. For instance, a network flow database, such as database 322 illustrated in FIG. 3, can be clustered into an arbitrarily chosen number of clusters. In a number of examples, this can be performing using a clustering model (e.g., algorithm). The network flow database can include, for instance, applications (e.g., mobile applications).

At 664, method 660 includes determining a threshold cluster size and removing any of the number of clusters having a size greater than the threshold cluster size. For example, a threshold cluster size of 10 bytes may be chosen, and any cluster size greater than 10 bytes is removed (e.g., sent to a residual database) while any cluster size falling within the threshold cluster size (e.g., 10 bytes or smaller) is determined to be a "top" cluster. In some instances, the threshold cluster size can be expanded (e.g., periodically) to accommodate nearby network flows.

At 664, method 660 includes detecting a network flow that falls outside of each of the particular number of clusters of network flows. In a number of examples, a suspected "new" network flow may be detected. For instance, it falls outside of all of the top clusters. To determine if this is truly a new network flow, at 668, method 660 includes computing a distance between the network flow and a centroid of each of the particular number of clusters of network flows. By doing so, it can be determined whether or not the network flow falls outside the threshold cluster size.

At 670, method 660 includes classifying the network flow as a new network flow or an existing network flow based on the distance. For instance, this can include classifying the network flow as new in response to the distance falling outside the threshold cluster size or classifying the network flow as existing in response to the distance falling within the threshold cluster size. A new classification may mean the network flow has never been seen in the network and/or the network flow may be malicious (e.g., a malicious application). More learning may be done as same or similar network flows enter the network flow database. An existing classification may mean the network flow is the same or similar to others, and can be clustered with existing network flows.

In the present disclosure, reference is made to the accompanying drawings that form a part hereof, and in which is shown by way of illustration how a number of examples of the disclosure can be practiced. These examples are described in sufficient detail to enable those of ordinary skill in the art to practice the examples of this disclosure, and it is to be understood that other examples can be used and that process, electrical, and/or structural changes can be made without departing from the scope of the present disclosure.

The figures herein follow a numbering convention in which the first digit corresponds to the drawing figure number and the remaining digits identify an element or component in the drawing. Elements shown in the various figures herein can be added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense.

As used herein, "logic" is an alternative or additional processing resource to perform a particular action and/or function, etc., described herein, which includes hardware, e.g., various forms of transistor logic, application specific integrated circuits (ASICs), etc., as opposed to computer executable instructions, e.g., software firmware, etc., stored in memory and executable by a processor.

The above specification, examples and data provide a description of the method and applications, and use of the system and method of the present disclosure. Since many examples can be made without departing from the spirit and scope of the system and method of the present disclosure, this specification merely sets forth some of the many possible embodiment configurations and implementations.

What is claimed is:

1. A system, comprising:
   a processor;
   a storage device coupled to the processor and storing instructions which when executed by the processor cause the processor to perform a method, the method comprising:
   clustering a number of network flows within a network into a number of clusters;
   computing a cluster centroid for each cluster, wherein the cluster centroid denotes a flow signature for the cluster, and wherein the flow signature comprises at least sizes of a predetermined number of packets;
   determining a cluster size associated with each cluster based on the computed cluster centroid;
   in response to determining that the cluster size of a particular cluster exceeds a predetermined threshold value, removing the particular cluster from the number of clusters and transferring network flows associated with the removed particular cluster to a residual database;
   detecting a network flow that is not within any one of the remaining number of clusters of network flows;
   calculating a distance between the network flow and the cluster centroid of each of the remaining number of clusters;
   determine a threshold distance; and
   classifying the network flow based on whether or not the distance between the network flow and each of the remaining number of clusters falls within the threshold distance.

2. The system of claim 1, wherein classifying a network flow comprises classifying the network flow as a new network flow or an existing network flow based on the calculated distances.

3. The system of claim 1, wherein the method further comprises:
   classifying the network flow as a new network flow in response to a determined distance between the network flow and a centroid of a particular cluster being greater than a threshold distance.

4. The system of claim 1, wherein the method further comprises:
   classifying the network flow as an existing network flow in response to a determined distance between the network flow and a centroid of a particular cluster being less than a threshold distance.

5. The system of claim 1, wherein the method further comprises:
   auto-learning the number of clusters and the shape of each of the number of clusters.

6. The system of claim 1, wherein clustering the number of network flows comprises using an unsupervised clustering approach on at least one of an existing network flow database and a real-time network flow capture system.

7. A non-transitory machine readable medium storing instructions executable by a processing resource to cause a computer to:
   cluster a network flow database into a number of clusters of network flows;
   compute a cluster centroid for each cluster, wherein the cluster centroid denotes a flow signature for the cluster, and wherein the flow signature comprises at least sizes of a predetermined number of packets;
   determine a cluster size associated with each cluster based on the computed cluster centroid;
   in response to determining that the cluster size of a particular cluster exceeds a predetermined threshold value, remove the particular cluster from the number of clusters and transfer network flows associated with the removed particular cluster to a residual database;
   detect a network flow that is not within any one of the remaining number of clusters of network flows;
   calculate a distance between the network flow and the cluster centroid of each of the remaining number of clusters;
   determine a threshold distance; and
   classify the network flow based on whether or not the calculated distance between the network flow and each of the remaining number of clusters falls within the threshold distance.

8. The non-transitory machine readable medium of claim 7, wherein the instructions executable to cluster the network flow database include instructions executable to learn a signature of an application, wherein the application is associated with a network flow within the number of clusters of network flows.

9. The non-transitory machine readable medium of claim 7, wherein the instructions executable to cluster the network flow database include instructions executable to iteratively cluster the network flow database until a termination criterion is met.

10. The non-transitory machine readable medium of claim 9, wherein the termination criterion includes at least one of all flows within the network flow database is clustered and all viable clusters are formed.

11. A method, comprising:
  clustering a network flow database into a number of clusters of network flows;
  computing a cluster centroid for each cluster, wherein the cluster centroid denotes a flow signature for the cluster, and wherein the flow signature comprises at least sizes of a predetermined number of packets;
  determining a cluster size associated with each cluster based on the computed cluster centroid;
  determining a threshold cluster size and removing any of the number of clusters having a cluster size greater than the threshold cluster size;
  transferring network flows associated with the removed clusters to a residual database;
  detecting a network flow that falls outside of each of the remaining number of clusters of network flows;
  computing a distance between the network flow and the cluster centroid of each of the remaining number of clusters of network flows;
  determining a threshold distance; and
  classifying the network flow as a new network flow or an existing network flow based on whether or not the computed distance between the network flow and each of the remaining number of clusters falls within the threshold distance.

12. The method of claim 11, including periodically expanding the threshold cluster size to accommodate nearby network flows.

13. The method of claim 11, wherein classifying the network flow includes:
  classifying the network flow as new in response to the computed distance falling outside the threshold cluster size; and
  classifying the network flow as existing in response to the computed distance falling within the threshold cluster size.

* * * * *